3,458,481
PROCESS FOR THE PREPARATION OF HIGH MOLECULAR WEIGHT CROSS-LINKED POLYAMIDES
Ernst Reichold, Krefeld, and Walter Böckmann, Krefeld-Urdingen, Germany, assignors to Farbenfabriken Bayer Aktiengesellschaft, Leverkusen, Germany, a corporation of Germany
No Drawing. Filed Sept. 27, 1965, Ser. No. 490,675
Claims priority, application Germany, Oct. 31, 1964, F 44,350
Int. Cl. C08g 20/38, 30/14
U.S. Cl. 260—78    1 Claim

ABSTRACT OF THE DISCLOSURE

Method of preparing high molecular weight cross-linked polyamides of high melt viscosity and improved dimensional stability comprising forming a melt of a polyamide, i.e., polycaprolactam, incorporating 0.1 to 5% by weight of a cross-linking agent, i.e., diepoxycyclohexylalkane into said melt, allowing the resultant melt to solidify and heating the solidified mixture at a temperature of between 150 and 200° C., but below the melting point of said polycaprolactam in a nitrogen atmosphere saturated with water vapor.

---

This invention relates to a process for the preparation of high molecular weight cross-linked polyamides of high melt viscosity in which the cross-linked polyamides are subjected to an after-treatment.

High molecular weight linear polyamides, e.g. poly-ε-caprolactam and polyhexamethylene adipamide, are suitable for numerous technical purposes because of their excellent chemical resistance and because of the excellent mechanical properties of the shaped articles manufactured from them. When these polyamides are shaped via the liquid melt, highly fluid melts are formed which have a low dimensional stability in the melt and which are little suited for the manufacture of profiles, tubes, deep drawn parts and in particular articles produced by blow forming.

It has already been proposed to increase the viscosity of the polyamide melts by the addition of cross-linking agents which are capable of reacting with the reactive hydrogen atoms. Cross-linking agents which may be used for this purpose are, for example, epoxy resins, low molecular weight compounds which contain epoxide groups, and isocyanates. Examples of suitable compounds of this type are di- or polyepoxides of mono- or polybasic amines, e.g. N-di-(2:3-epoxypropyl)-aniline, hexamethylene diisocyanate or compounds which split off isocyanates such as the addition product of 2 mols of phenol or 2 mols of caprolactam and 1 mol of hexamethylene diisocyanate.

Dioxides of dicyclohexenylalkanes have also been suggested as cross-linking agents for linear polyamides. The more cross-linking agent that is added to these polyamides, the higher becomes the viscosity of the melts. Polyamides which are suitable for use and have a relative viscosity of up to about 4.0 can be prepared in this way. Although such polyamides can be worked up quite well on the usual screw presses, they are still not firm enough in particular for the production of articles by blow molding and for the production of certain semi-finished articles. Further increasing the viscosity and the stability under load by adding larger quantities of cross-linking agents, e.g. 2% by weight or more, does not lead to the desired result since the melts then become rubbery and elastic in nature. Owing to the restoring forces of such melts, difficulties of conveying the material arise in the extruder, which lead to irregular ejection and inaccurate dosing and hence to inferior products.

It has further already been described that by polymerization in the melt or by after-condensation in the solid state, it is possible to produce polyamides of increased molecular weight, for example of more than 30,000, corresponding to a relative viscosity of more than about 4.0, which have a higher melt viscosity and better dimensional stability in the molten state. In this process, the after-condensation can be carried out in an inert atmosphere or in vacuo. However, these products are only suitable to a limited extent for the production of profiles, tubes, blow molded articles and deep drawn parts.

In the blow molding process, only hollow bodies of small volume can be obtained reasonably satisfactorily and even in these, the still insufficient mechanical stability of the melt manifests itself clearly in the products. The blown articles have an uneven wall thickness and tend to undergo distortion. It is quite impossible to obtain large containers by this process. Plates produced from this material have a strong tendency to sag when heated and are therefore not suitable for deep drawing. Rods can only be manufactured reasonably satisfactorily in diameters of more than about 20 mm. from this material.

A process for the preparation of high molecular weight cross-linked polyamides of high melt viscosity has now been found in which cross-linking agents are added to the melt of the linear polyamides, having relative viscosities (intrinsic viscosities) of between 0.5 to 3.0, the melt is left to solidify and the solid polyamides obtained are then heated below the melting point in an inert gas atmosphere containing water vapor.

In this process, the polyamides to which cross-linking agents have been added are advantageously heated at temperatures between 150° and 200° C. in a nitrogen atmosphere saturated with water vapor. The customary cross-linking agents may be used and these may be added in quantities of 0.1 to 5% by weight to the linear polyamides. Especially suitable cross-linking agents are the dioxides of dicyclohexenyl alkanes. Apart from the cross-linking agents, other substances may be added to the polyamides to modify their properties, for example age resistors, pigments, dyestuffs, metal powders, fillers, plasticizers and synthetic resins or plastics, crystallization nuclei and mold parting agents.

Polyamides which have relative viscosities of above 4 and the melts of which have a particularly high dimensional stability are obtained by this process. Starting from the unstabilized or only slightly stabilized polyamide, the cross-linking agent can be incorporated in it in the extracted or unextracted state and the material, which still has a relatively low viscosity, can be subjected to an after-condensation below the melting point in a stream of inert gas (nitrogen or carbon dioxide) which contains water vapor. If one starts from the unextracted product, a product low in monomer is immediately obtained. The advantage of this is that it is not necessary first to produce a highly viscous material and that consequently the inefficient and technically difficult process of working with a highly viscous melt of a melt viscosity of, for example, $10^6$ poises in an extruder can be avoided.

Under technically favourable conditions, the material can be produced by adding the cross-linking agent to a continuously operating polymerization plant immediately prior to spinning and then putting the monomer-containing, moist granulate into the after-condensation process.

Owing to their particularly high dimensional stability, the polyamides prepared by the process are especially suitable for the production of hollow bodies of uniform wall thickness, for example for the production of bottles, canisters, fuel tanks and large volumed containers of all kinds. The following examples illustrate the practice of the invention in more detail:

Example 1

250 g. of a granulate of polycaprolactam which had been prepared in the usual way without the addition of chain breaking agents and into which 0.6% of 2:2-bis-[3:4-epoxycyclohexyl]-propane had been incorporated in an extruder after drying were subjected to after-condensation at a temperature of 180° C. in a 500 ml. glass flask for 24 hours in a stream of nitrogen which had been saturated with water vapor at 50° C.

Relative viscosity ($n_R$) before the addition of cross-linking agent, measured from a 1% by weight concentration in m-cresol at 25° C. in an Ubbelohde viscosimeter: 2.84 (relative solution viscosity $n_R$); extract: approximately 8%; condensation time: 24 hours; nitrogen current: 200 l./hour; final viscosity $n_R$: 4.43; extract: about 1.5%.

Example 2

250 g. of a granulate of polycaprolactam which had been polymerized in the usual manner without the addition of chain-breaking agents and into which 0.6% of 2:2-bis-[3:4-epoxycyclohexyl]-propane were incorporated in an extruder after drying were subjected to after-condensation as a temperature of 190° C. in a 500 ml. glass flask for 24 hours in a stream of nitrogen which had been saturated with water vapor at 50° C.

Relative initial viscosity before the addition of the cross-linking agent, measured in a 1% concentration in m-cresol at 25° C.: 2.84; extract: approximately 8%; condensation time: 24 hours; nitrogen current: 200 l./hour; final viscosity $n_R$: 4.93; extract: approximately 1.5%.

Example 3

250 g. of granulate of polycaprolactam which had been polymerized in the usual manner without the addition of chain breaking agents were washed with hot water until the residual extract content was 0.7%. The granulate was then dried in vacuo at 100° C. to a moisture content of 0.1% and 0.6% of 2:2-bis-[3:4-epoxycyclohexyl]-propane was then incorporated homogeneously in an extruder. The product was then subjected to after-condensation at 185° C. in a 500 ml. glass flask in a stream of nitrogen which had been saturated with water vapor at 50° C.

Relative initial viscosity: 3.16; extract: 0.7%; condensation time: 24 hours; nitrogen stream: 200 l./hour; final viscosity $n_R$: 4.93; extract: 0.5%.

Example 4

250 g. of granulate were prepared and after-condensed as described in Example 3.

The condensation time, however, was 48 hours at 185° C.; final viscosity $n_R$: 6.15; extract: 0.4%.

Example 5

250 g. of a granulate of polycaprolactam which had been polymerized in the usual manner with the addition of 0.12% of acetic acid as chain breaking agent and into which 0.6% of 2:2-bis-3:4-epoxycyclohexyl-propane had been incorporated in an extruder after drying were subjected to after-condensation at a temperature of 185 C. in a 500 ml. glass flask for 24 hours in a stream of nitrogen which had been saturated with water vapor at 50° C.

Relative initial viscosity before the addition of cross-linking agent, measured in m-cresol at 25° C.: 263. Extract: approximately 8%; condensation time: 24 hours; nitrogen stream: 200 l./hour; final viscosity $n_R$: 4.41; extract: 1.5%.

Example 6

250 g. of granulate were prepared and after-condensed as described in Example 5 but the condensation time was 48 hours at 185° C. final viscosity $n_R$; 5.12; extract: 1%.

What we claim is:

1. Process of preparing a high molecular weight cross-linked polycaprolactam having a high melt viscosity and improved dimensional stability comprising forming a melt of polycaprolactam having a relative solution viscosity of from about 2.6 to about 3.2, measured from a 1% by weight solution in m-cresol at 25° C. in an Ubbelohde viscosimeter, incorporating into the melt thereby formed 0.1 to 5% by weight of a diepoxycyclohexyl alkane as cross-linking agent, allowing the resultant mixture to solidify and heating the solidified mixture at a temperature of between 150 and 200° C. but below the melting point of said polycaprolactam in a nitrogen atmosphere saturated with water vapor to produce a cross-linked polycaprolactam having a relative solution viscosity above 4.

References Cited

UNITED STATES PATENTS

| | | | |
|---|---|---|---|
| 3,155,637 | 11/1964 | Reichold et al. | 260—78 |
| 2,333,639 | 11/1943 | Christ et al. | 260—78 |
| 2,393,972 | 2/1946 | Cairns | 260—78 |
| 2,430,859 | 11/1947 | Cairns | 260—78 |
| 2,631,993 | 3/1953 | Morgan | 260—78 |
| 3,203,934 | 8/1965 | Wellens et al. | 260—78 |
| 3,294,755 | 12/1966 | Tanner | 260—78 |
| 3,299,009 | 1/1967 | Bruck | 260—78 |
| 3,329,657 | 7/1967 | Strazdins et al. | 260—78 |

FOREIGN PATENTS

| | | |
|---|---|---|
| 880,761 | 10/1961 | Great Britain. |
| 1,024,407 | 3/1966 | Great Britain. |

HAROLD D. ANDERSON, Primary Examiner

U.S. Cl. X.R.

260—33.4, 37, 830, 857